United States Patent [19]

Walker

[11] 3,925,920

[45] Dec. 16, 1975

[54] RELEASABLE LINE-HOLDING DEVICE

[75] Inventor: William S. Walker, Portage, Mich.

[73] Assignee: Pacific-Atlantic Products, Ltd., Portage, Mich.

[22] Filed: Mar. 29, 1974

[21] Appl. No.: 456,132

[52] U.S. Cl.............................. 43/43.12; 43/44.95
[51] Int. Cl.²......................................... A01K 95/00
[58] Field of Search............ 43/43.12, 44.95, 44.92, 43/44.93, 43.14, 44.88

[56] References Cited
UNITED STATES PATENTS

| | | | |
|---|---|---|---|
| 2,591,332 | 4/1952 | Behensky | 43/44.88 |
| 2,699,624 | 1/1955 | Vawryk | 43/44.95 |
| 2,775,843 | 1/1957 | Leiser | 43/44.95 |
| 3,081,575 | 3/1963 | Meisner | 43/43.12 |
| 3,659,370 | 5/1972 | Ritter | 43/43.12 |

*Primary Examiner*—Warner H. Camp
*Attorney, Agent, or Firm*—Donald E. Overbeek

[57] ABSTRACT

For use in fishing by trolling, a releasable, fishing line-holding device that holds a fishing line to a downrigger line or weight below the water surface until a hooked fish pulls the fishing line free of the device. The fishing line is held by the device between a tapered line-holding seat and a tapered line-holding plug that is resiliently urged against the seat, from which a hooked fish can pull the line free. Means are provided for adjusting the force by which the fishing line is held.

8 Claims, 8 Drawing Figures

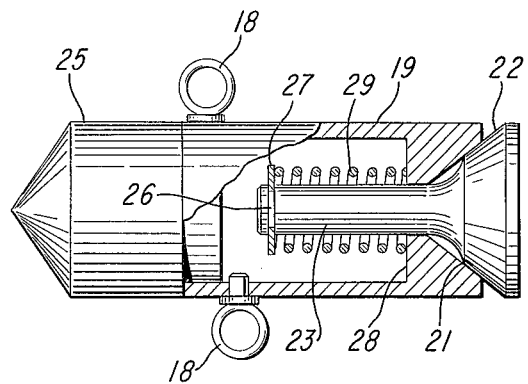
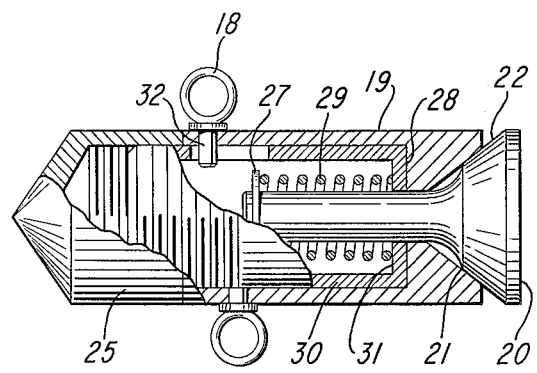
figure 5    figure 6
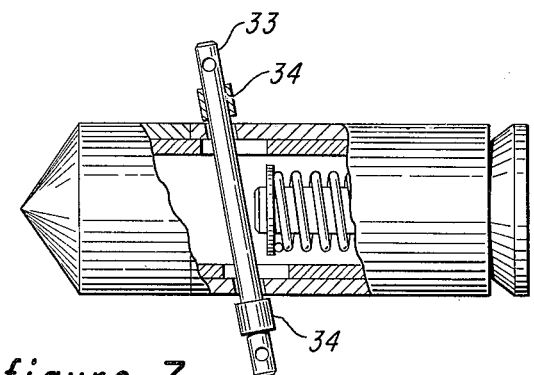
figure 7
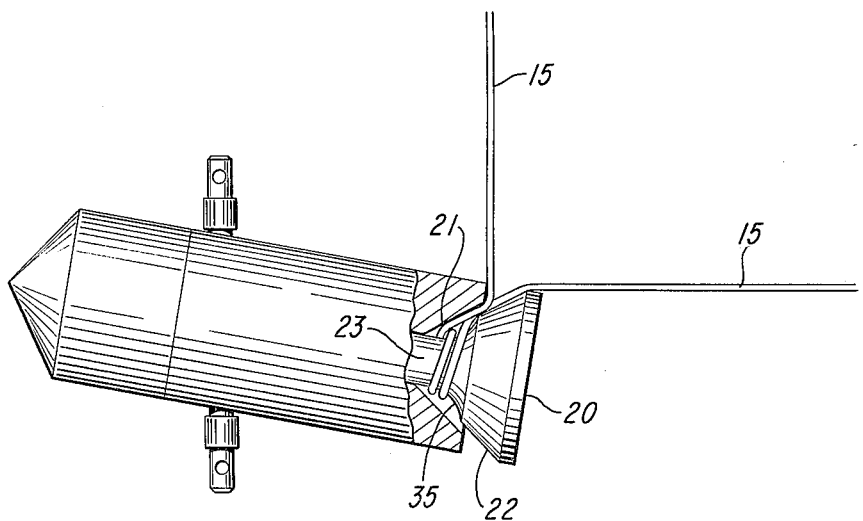
figure 8

RELEASABLE LINE-HOLDING DEVICE

BACKGROUND OF THE INVENTION

Trolling is an often used method for fishing, particularly for large fish in large bodies of water. In trolling, a baited hook or lure on the end of the fishing line is pulled behind a moving boat. In so doing, the line and the bait or lure tend to rise in the water, although it is often desired to maintain the bait or lure at lower water depths. Two methods of maintaining the bait or lure at lower water depths employ the use of a weighted bait or lure or the use of an extremely long fishing line, both of which are unsatisfactory. Still another method of maintaining the moving line and bait or lure at lower water levels is to employ a weight known as a downrigger weight. The downrigger weight is releasably attached to the fishing line forward of the bait or lure. In this way, the weight maintains the bait or lure at lower water depths with minimum interference on the action of the trolled bait or lure. It is desired that the weight remain attached to the fishing line in spite of the water drag resistance against the bait or lure and in spite of the bait or lure meeting moderately increased drag as it moves through weeds and the like, yet that the fishing line release from the weight upon the fish striking and hooking itself on the hooks of the bait or lure. The fisherman is then at liberty to control and land the fish without the presence of the weight attached to the fishing line. In usual practice the downrigger weight is connected by a downrigger line to the boat, whereby the weight, and the bait or lure, can be adjusted to the desired depth and the weight can be retrieved after the fishing line has released from the weight. Such a trolling technique is described in U.S. Pat. Nos. No. 3,659,370 and 3,628,274. The fishing line can be releasably attached to the downrigger weight or to the downrigger line at some point above the downrigger weight, as destined.

Two devices for releasably attaching the fishing line to the downrigger weight or to the downrigger line are described in U.S. Pat. Nos. 3,639,370 and 3,628,274. The device described in U.S. Pat. No. 3,628,274 does not include easy and reproducible adjustment of the force by which the fishing line is held. The device described in U.S. Pat. No. 3,659,370 does not include versatility of permitting use of a single device with a large variety of weights and diameters of fishing lines.

Whereas prior described devices are satisfactory for use under given, limited circumstances, it is an object of this invention to provide a reliable releasable fishing line-holding device which can hold a fishing line to a downrigger line or weight at a determined water level and which reliably releases the fishing line when a fish becomes hooked on the bait or lure at the end of the fishing line. It is a further object to provide such a device which is readily adjustable, with or without the fishing line being attached while adjustment is being made, to provide a desired force by which the line is held. It is a still further object to provide a device which can be used for a great variety of sizes, weights and types of fishing lines. These and still other objects of this invention will be apparent from the description herein.

SUMMARY OF THE INVENTION

This invention is a releasable, fishing line-holding device comprising a hollow, cylindrical outer housing having a line-holding end and a leading end, the bore of said outer housing at its line-holding end being tapered progressively smaller from the outside inwardly, a poppet-shaped, line-holding plug member having a tapered line-holding portion and a plug stem, said line-holding plug portion tapering progressively smaller in diameter toward the juncture of said line-holding plug portion with said plug stem, the angle of taper of the bore at the line-holding end of said outer housing being substantially equal to the angle of taper of said line-holding plug portion so as to provide a line-holding seat in the line-holding end of said outer housing for said line-holding plug portion, the diameter of said plug stem being less than the inside diameter of the bore at the base of the line-holding seat in said line-holding end of said outer housing, said line-holding plug member being positioned with said plug stem projecting into said outer housing and the tapered surface of said line-holding plug portion resting against the tapered line-holding seat in the line-holding end of said outer housing, the size of said line-holding plug portion being sufficiently large so that part of said line-holding plug portion projects outside the end of said outer housing, means for resiliently urging said line-holding plug portion against the tapered line-holding seat in said line-holding end of said outer housing, and means for attaching said device to the downrigger system. During the trolling operation the device is attached to the downrigger line or weight and the fishing line is attached to the device. Upon the event of a fish becoming hooked on the hooks of the bait or lure, the force or drag of the fish pulls the fishing line free of the device.

In its preferred embodiment, a spring means is mounted within the outer housing and attached to the line-holding plug member to urge the line-holding plug portion against the line-holding seat in the end of the outer housing. Spring means can be a tension spring under elongated tension or a compression spring under compressed tension. In a further preferred embodiment, means are provided to permit adjustment of tension or compression of the spring means, thereby adjusting the force by which the line-holding plug portion is urged against the line-holding seat and thereby varying the amount of force required to pull the fishing line free of the device.

DESCRIPTION OF THE DRAWINGS

FIG. 5 is a cut-away view similar to FIG. 3 of a modified form of the invention showing the positioning within the outer housing of a compression spring serving to urge the line-holding plug portion against the line-holding seat.

FIG. 6 is a cut-away, cross-sectional view similar to FIG. 5, showing a modification of the invention wherein the compression of the compression spring is adjustable.

FIG. 7 is a view similar to FIG. 6 showing modified means for attaching the device to the downrigger system.

FIG. 8 is a side elevation view, partially cut away, showing the manner in which the fishing line is attached to the device.

DESCRIPTION OF THE PREFERRED EMBODIMENTS

Figure 1:
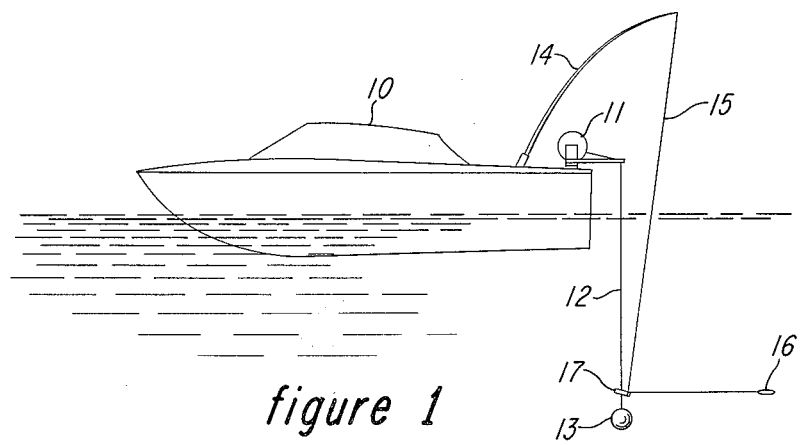
FIG. 1 is a schematic view of a boat, a downrigger line and weight, and fishing pole, fishing line and lure, showing the device attached to the downrigger line above the downrigger weight and showing the fishing line attached to the device.

Referring to FIG. 1, the boat 10 is shown, on which is mounted a downrigger mechanism 11 which controls a downrigger line 12 and downrigger weight 13. The fishing rod 14 controls the fishing line 15, at the end of which is attached a baited hook or lure 16. FIG. 1 shows the device 17 of this invention attached to the downrigger line 12, intermediate between the downrigger weight 13 and the surface of the water, and the fishing line 15 attached to the releasable, fishing line-holding device 17 of this invention. Alternatively, the device 17 can be attached to the downrigger weight 13 itself.

Figure 2:
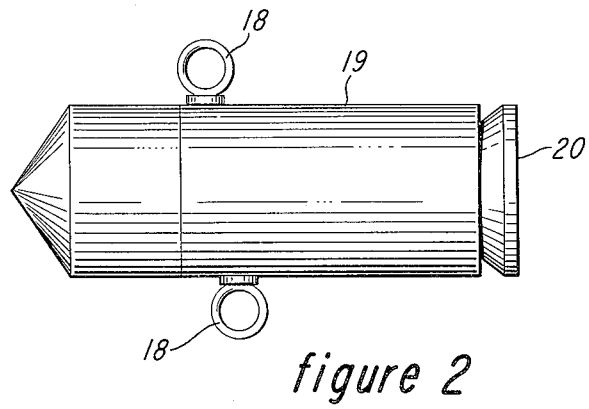
FIG. 2 is a side elevation view of the device.

To attach the device to the downrigger line 12 intermediate between the downrigger weight 13 and the surface of the water, use is made of attaching rings 18 shown in FIG. 2.

Figure 3:
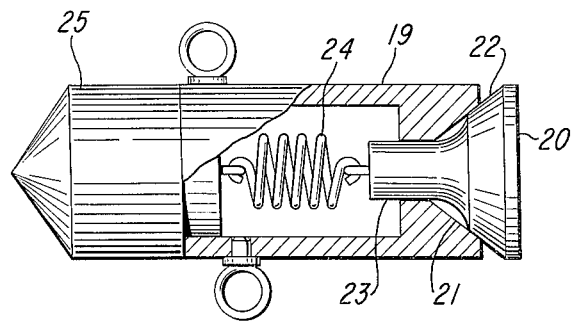
FIG. 3 is a cut-away view, showing longitudinal cross-section view of the outer housing and line-holding plug and showing a tension spring positioned within the outer housing for urging the line-holding plug portion against the line-holding seat.

FIG. 3 shows the hollow cylindrical outer housing 19 and a tapered, poppet-shaped line-holding plug member 20. One end of the outer housing 19 can be identified as the line-holding end and the other end as the leading end. The bore of the outer housing 19 at its line-holding end is tapered progressively smaller inwardly, to provide a tapered, line-holding seat 21, against which the line-holding plug member 20 is urged. The line-holding plug member 20 has the shape of a poppet valve, having a conically configured, line-holding plug portion 22 constricting to a plug stem 23. The plug stem 23 is of sufficiently less diameter than the bore of the opening at the base of the line-holding seat 21 to permit free movement of said plug stem 23 in and out of the bore of the opening at the base of the line-holding seat 21.

The angle of the taper of the line-holding seat 21 is substantially the same as the angle of the taper of the line-holding plug portion 22. The angle can be in the range of 10° to 80° as measured from the longitudinal axis of the outer housing 19, the preferred angle being in the range of 25° to 75°. A large angle is better for a light weight fishing line. The line-holding plug portion 22 is longer in length than the depth of the line-holding seat 21, so that in the assembled device there is a meeting of tapered surface of the line-holding plug portion 22 against the tapered surface of the line-holding seat 21 and so that there is a substantial part of the line-holding plug portion 22 projecting outside the end of the outer housing 19. Alternatively stated, the diameter of the line-holding plug portion 22 is greater than the inside diameter of the line-holding seat 21, so that a substantial part of the line-holding plug portion 22 remains projecting outside the end of the outer housing 19 even though tapered surface of said line-holding plug portion 22 is resting against tapered surface of the line-holding seat 21. It is preferred that the diameter of the line-holding plug portion 22 at its external face be larger than the outside diameter of the outer housing 19. This will provide greater convenience, in the use of the device, in attaching the fishing line to the device.

In FIG. 3, tension spring 24 holds the line-holding plug member 20 in place and urges the line-holding plug portion 22 against the line-holding seat 21. One end of the tension spring 24 is attached to the end of the plug stem 23 within the outer housing 19. The other end of the tension spring 24 is attached, under elongated tension, to a capping member 25 at the leading end of the outer housing 19. The manner of installing the tension spring 24 is not critical and it is expected that one skilled in mechanical procedures can do this. For example, the capping member 25 can be made of a heat fusible material and bear a longitudinal hole of sufficient size to receive a stout wire. For assembly, the line-holding plug member 20 is put into place, the tension spring 24 is attached to the end of the plug stem 23, a stout wire is attached to the other end of the tension spring 24. The capping member 25 is fitted over the stout wire and attached to the leading end of the outer housing 19. The outer housing 19 is held rigidly and the desired tension is put on the tension spring 24 by a pulling force on the stout wire. The capping member 25 is then heated to fuse the capping member material to constrict sufficiently about the wire. Upon cooling, the wire becomes rigidly held by the capping member 25, whereby the tension spring 24 remains under elongated tension.

Figure 4:
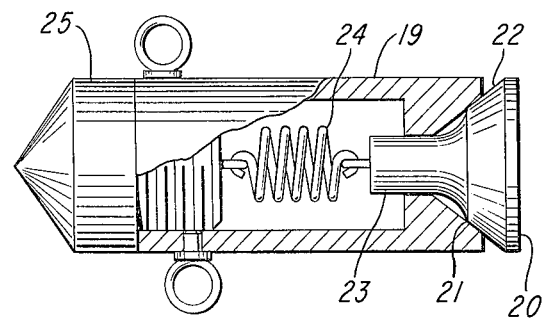
FIG. 4 is a cut-away view similar to FIG. 3 showing a modified form of the invention wherein the spring tension is adjustable.

FIG. 4 shows a modification of the device in which the amount of tension of the tension spring 24 can be adjusted. The inner surface of the bore of the leading end of the outer housing 19 is tapped with machine threads. The capping member 25 is sized and threaded to fit and engage the threads on the inner surface of the bore at the leading end of the outer housing 19. The capping member 25 is screwed into place in the leading end of the outer housing 19, and the tension spring 24 is sealed to the capping member 25. In use of the device having this modification, the capping member 25 can be turned on its threads to move it outward, thereby elongating the tension spring 24 and increasing the force by which the line-holding plug portion 22 of line-holding plug member 20 is urged against the line-holding seat 21. Conversely, the capping member 25 can be turned inward to decrease the tension of tension spring 24.

Referring to FIG. 5, the line-holding plug portion 22 can be resiliently urged against the line-holding seat 21 by means of a compression spring 29. There is a circumferential recess 26 in the plug stem 23 near the end of the plug stem 23 opposite the line-holding plug portion 22. This recess 26 serves to receive a spring-retaining clip 27. The line-holding end of the outer housing 19 has an inner, spring-retaining flange 28. As hereinbefore described in reference to FIGS. 3 and 4, the bore of the inner, spring-retaining flange 28 is tapered progressively smaller from the outside inwardly, to provide the line-holding seat 21 for the line-holding plug portion 22 of the line-holding plug member 20. The compression spring 29 has an inner diameter greater than the diameter of the plug stem 23 and and outer diameter less than the inner diameter of the outer housing 19, to permit free longitudinal movement of the compression spring 29. The bore of the spring-retaining flange 28 at the base of the line-holding seat 21 is sufficiently larger than the diameter of the plug stem 23 to permit free longitudinal movement of the plug stem 23 through the bore of the spring-retaining flange 28. To assemble the device employing a compression spring, referring to FIG. 5, the plug stem 23 is inserted through the bore of the spring-retaining flange 28 at the end of the outer housing 19. Through the leading end of the outer housing 19, the compression spring 29 is positioned around the plug stem 23. The compression spring 29 is compressed against the inner face of the spring-retaining flange 28, and the spring-retaining clip 27 is inserted into place at the end of the plug stem 23 opposite the line-holding plug portion 22. A capping member 25 is then attached to the leading end of the outer housing 19. However it is not essential to this invention in this modified form to close the leading end of the outer housing 19. Rings 18 are attached externally to the outer housing 19 as means of attaching the device to the downrigger line 12.

It is obvious that a compression spring must be chosen having length and compression strength appropriate to provide in the assembled device the desired force urging the line-holding plug member 22 against the line-holding seat 21. This can be accomplished by those skilled in the art of mechanical spring devices.

Referring to FIG. 6, a modification of the device hereinbefore described in reference to FIG. 5 includes a means of adjusting the amount of compression of the compression spring 29, thereby adjusting the amount of force by which line-holding plug portion 22 is urged against the line-holding seat 21, thereby adjusting the amount of force which must be applied to the fishing line to release it from the device 17. A spring housing 30 is employed which is a hollow cylinder having an inner spring-retaining flange 31 at its one end, referred to as its flanged end. The outside diameter of the spring housing 30 is less than the inside diameter of the outer housing 19, and the inside diameter of the spring housing 30 is greater than the outside diameters of the compression spring 29 and the spring-retaining clip 27, thereby permitting the spring housing 30 to fit within the outer housing 19 and permitting free longitudinal movement of the spring housing 30 within the outer housing 19 and independent of longitudinal movement of the compression spring 29 and spring-retaining clip 27. The diameter of the bore of the spring-retaining flange 31 of the spring housing 30 is sufficiently large to permit longitudinal movement of the plug stem 23 but less than the outside diameter of the compression spring 29. The end of the spring housing 30 opposite its flanged end is machine threaded on its outer surface. The capping member 25 has external diameter at least greater than the inner diameter of the outer housing 19. The capping member 25 is hollow and its inner surface is sized and machine threaded to engage the machine threads at the threaded end of the spring housing 30. In the assembled device having this modification, the spring housing 30 is placed within the outer housing 19 with the spring-retaining flange 31 of the spring housing 30 abutting the inner, spring-retaining flange 28 of the outer housing 19. It is apparent that the spring housing 30 is sufficiently longer than the distance from the leading end of the outer housing 19 to the inside face of the spring-retaining flange 28 of the outer housing 19, to provide sufficient engagement of the machine threads at the end of the spring housing 30 with the machine threads of the capping member 25 in the assembled device.

Means are provided to prevent rotation of the spring housing 30 within the outer housing 19 when the capping member 25 is turned with its threaded surface engaging the threads on the spring housing 30. Referring to FIG. 6, means for accomplishing this can be provided by a longitudinal slot cut in the wall of the spring housing 30 and a projection of the ring stem 32 of the ring 18 through the wall of the outer housing 19 into the longitudinal slot in the wall of the spring housing 30, said longitudinal slot being only sufficiently wide to receive said projection of ring stem 32 to prevent rotational movement of the spring housing 30, and sufficiently long, longitudinally, to permit longitudinal movement of the spring housing 30 within the outer housing 19. Other means for accomplishing this will be apparent.

To assemble the device in reference to FIG. 6, the spring housing 30 is placed within the outer housing 19 with the spring-retaining flange 31 of the spring housing 30 abutting the inner spring-retaining flange 28 of the outer housing 19. The line-holding plug member 20 is inserted through the bore at the base of line-holding seat 21 and through the bore of the spring-retaining flange 31 of the spring housing 30, with the plug stem 23 inside the spring housing 30. The compression spring 29 is placed around the plug stem 23 with one end of the compression spring 29 abutting the inner face of the spring-retaining flange 31. Spring-retaining clip 27 is then put into place at the end of plug stem 23 to retain the other end of compression spring 29. The slot in the wall of the spring housing 30 is aligned with a ring stem receiving hole in the wall of the outer housing 19 and the ring stem 32 of ring 18 is fixed in place, said ring stem 32 projecting into said slot. Capping member 25 is then screwed on to the threads of the spring housing 30 projecting from the open end of the outer housing 19. By grasping the outer housing 19 and turning the capping member 25 in one direction on the engaged threads, the spring housing 30 and its spring-retaining flange 31 can be moved toward the capping member 25, thereby further compressing the compression spring 29 and increasing the force with which the line-holding plug portion 22 is urged against the line-holding seat 21. By turning capping member 25 in the other direction, the compression of compression spring 29 can be decreased. The length of the compression spring 29 can be equal to the distance between the spring-retaining flange 31 and the spring-retaining clip 27 so that compression spring 29 need not be compressed during assembling of this device. Spring compression can be obtained by turning the threaded capping member 25. Alternatively, to obtain even greater fishing line-holding force of the device, the device can be assembled with a longer compression spring 29 and said compression spring 29 being held compressed when the spring-retaining clip 27 is put into place.

Referring to FIG. 7, a shaft 33 passing through the walls of the outer housing 19 and spring housing 30 can be used as means by which the device can be attached to a downrigger line 12. The shaft 33 is sufficiently smaller in diameter than the holes in the outer housing 19 through which it passes to permit the device 17 to rotate freely about the shaft 33. Shaft retaining rings 34 on the shaft 33 on both sides of the outer housing 19 hold the shaft 33 in place. Alternatively, the shaft 33 can be rigidly attached to the outer housing 19. The shaft 33 is positioned toward the leading end of the outer housing 19 so that it does not interfere with the internal members. Opposing, longitudinal slot openings in the wall of spring housing 30 permit passage of the shaft 33 and permit longitudinal movement of spring housing 30 and prevent rotational movement of spring housing 30 within the outer housing 19. Holes in the ends of the shaft 33 provide convenient means of attaching the device to the downrigger line 12.

Referring to FIG. 8, the fishing line 15 is attached to the device by wrapping a turn of the fishing line 15 around the projection of line-holding plug portion 22 and then pulling on both exposed portions of the fishing line 15, whereby the turn of the fishing line 15 slides along the decreasing circumference of the conically-shaped line-holding plug portion 22 toward the plug stem 23. A plurality of turns of fishing line 15 may be applied.

Referring to FIG. 1, in the trolling operation the releasable fishing line-holding device is attached to the downrigger system, preferably in the downrigger line 12, above the downrigger weight 13. The fishing line 15 with the bait or lure 16 attached is let out to the distance desired that the bait or lure 16 trail the downrigger system. The fishing line 15 is attached to the line-holding device 17, as hereinbefore described. Downrigger weight 13 and the device 17 are lowered into the water to the desired depth, additional fishing line 15 being let out from the fishing pole 14. In so doing, with the boat 10 moving forward, the bait or lure 16 trails behind the device 17 at the preselected distance and depth. If it is desired that the fishing line 15 be released from the device 17 promptly after a fish becomes hooked on the bait or lure 16, as is preferred, the segment of the fishing line 15 between the fishing rod 14 and the device 17 is kept taut. However, if it is desired that there be a delay between the hooking of the fish and the release of the fishing line 15, said segment of the fishing line 15 is permitted to be slack, whereupon the hooked fish can pull fishing line through the device 17, without release, until the line becomes taut, at which point the line will release from the device.

Referring to the various figures, the rings 18 are offset, one more forward than the other to the leading end of the outer housing 19. In use of the device, the more forward ring 18 is attached to the downrigger line 12 leading up to the boat 10, and the other ring 18 is attached to the downrigger line 12 leading down to the downrigger weight 13. Because of the offset of the rings 18, the device 17 is positioned at an angle relative to the downrigger line 12, such that, when the downrigger line 12 is vertical, the line-holding end of the device 17 is lower than its leading end. It will be apparent that, as the boat 10 moves forward, the drag of the water on the downrigger weight line 12 and weight 13 will cause the downrigger line 12 to hang suspended at an angle to the vertical, depending on the mass of the line 12 and weight 13 and on the forward speed of the boat 10. The angular location of the device 17 relative to the downrigger line 12 compensates for this angular suspension of the downrigger line 12 when the boat 10 moves forward. Moreover, in operation, even though the device works when its line-holding end is above the horizontal at angles of up to about 20° or below the horizontal at angles of up to about 45°, it is preferred that the connecting rings 18 be offset such that they be on a line at an angle of between 60° and 90° measured against the horizontal axis of the device 17. The foregoing is stated with respect to the rings 18, but it will be apparent as to how it applies to the angle of the shaft 33 shown in FIG. 7.

It has been discovered also that, referring to FIGS. 3 and 4, the plug stem 23 can be omitted and the one end of the tension spring 24 can be attached directly to the base of the line-holding plug portion 22. However, it is preferred to employ the plug stem 23 projecting through the bore at the base of the line-holding seat 21 into the outer housing 19. The plug stem 23 serves as a center around which the fishing line rests when the fishing line is being held.

In a preferred form of the invention, referring to FIG. 8, there is a line-holding relief 35 in the line-holding plug member 20 at or adjacent to the juncture of the line-holding plug portion 22 with the plug stem 23. This relief is preferably in the line-holding plug portion 22 adjacent to said juncture, but the relief may be provided instead in the plug stem 23 adjacent to said juncture. The relief can be made by machining the plug portion 22 or the plug stem 23 to a smaller diameter at the chosen location. The relief provides a space wherein one or more turns of the fishing line can assemble near the base of the line-holding seat 21. Instead of providing a line-holding relief 35 in the line-holding plug member 20, or in addition thereto, a similar line-holding relief can be provided in line-holding seat 21 near the base of said seat. The line-holding relief 35 permits greater versatility in the use of fishing lines of various weights and thicknesses. However, the device of this invention operates whether or not the line-holding relief is provided.

It will be apparent from the foregoing description that in the modification of the device wherein a tension spring is used under elongated tension as means for urging the line-holding plug portion 22 against the line-holding seat 21, the end of the tension spring 24 opposite the end attached to the plug stem 23, need not be attached to a capping member 25, but, instead, may be fixed by any other means available in the art.

It will be apparent that materials of construction of the device and its components can be chosen from a variety of materials including metals and plastics, but preferably materials that are corrosion-resistant.

It will be apparent that the device of this invention meets the various objects, particularly that the device can be used for various weights, thicknesses and types of fishing line. Other uses of the device in other forms of fishing and other more general uses of the device will be apparent from the foregoing description.

Whereas a limited number of embodiments of the invention have been described, various changes and modifications may be made without departing from the scope of the invention, being limited only as set forth in the following claims.

I claim:

1. A releasable, fishing line-holding device for use with a downrigger line and weight system for trolling, for releasably holding a fishing line to the downrigger system, said device comprising a hollow outer housing having a line-holding end with a bore passing therethrough and a leading end, the bore of said outer housing at its line-holding end being tapered progressively smaller from the outside inwardly, a poppet-shaped, line-holding plug member having a tapered line-holding portion and a plug stem, said tapered line-holding plug portion tapering progressively smaller in diameter toward the juncture of said tapered line-holding plug portion with said plug stem, the angle of taper of the bore at the line-holding end of said outer housing being substantially equal to the angle of taper of said tapered line-holding plug portion so as to provide a line-holding seat in the line-holding end of said outer housing for said tapered line-holding plug portion, the diameter of of said plug stem being less than the inside diameter of the bore at the base of the line-holding seat in said line-holding end of said outer housing, said line-holding plug member being positioned with said plug stem projecting into said outer housing and the tapered surface of said line-holding plug portion resting against the tapered line-holding seat in the line-holding end of said outer housing, the size of said tapered line-holding plug portion being sufficiently large so that part of said line-holding plug portion projects outside the end of said outer housing, means for resiliently urging said tapered line-holding plug portion against the tapered line-holding seat in said line-holding end of said outer housing, and means for attaching said device to the downrigger system at an angle thereto whereby said line-holding end of said device is at an angle measured against the horizontal of between 20° above the horizontal and 45° below the horizontal.

2. The device of claim 1 wherein said means for resiliently urging said tapered line-holding plug portion against said tapered line-holding seat in said line-holding end of said outer housing is a tension spring, one end of which is attached to the end of said plug stem within said outer housing and the other end of said tension spring being attached under elongated tension to means of fixedly holding said other end of said tension spring under elongated tension, the outside diameter of said tension spring being less than the inside diameter of said outer housing.

3. The device of claim 1 wherein the leading end of said outer housing is capped with a capping member and wherein said means for resiliently urging said tapered line-holding plug portion against said tapered line-holding seat in said line-holding end of said outer housing is a tension spring, one end of said tension spring being attached to the end of said plug stem within said outer housing and the other end of said tension spring being attached under elongated tension to the capping member, the outside diameter of said spring being less than the inside diameter of said outer housing.

4. The device of claim 3, wherein matching machine-threaded engaging surfaces of the outer housing at its leading end and the capping member are provided, whereby the tension of said tension spring can be adjusted by turning of the capping member on its threaded surface engaging the mating threaded surface of said outer housing.

5. The device of claim 1 wherein said means for resiliently urging said tapered line-holding plug portion against said line-holding seat in said line-holding end of said outer housing is provided by an inner, spring-retaining flange at said line-holding end of said outer housing, a spring-retaining clip fixed to the end of said plug stem within said outer housing, a compression spring surrounding said plug stem under compression between said inner, spring-retaining flange on the line-holding end of said outer housing and said spring-retaining clip at said end of said plug stem within said outer housing, the outer diameter of said compression spring being less than the inside diameter of said outer housing.

6. The device of claim 1 wherein said means for resiliently urging said line-holding plug portion against said line-holding seat in said line-holding end of said outer housing is provided by an inner flange at said line-holding end of said outer housing, a spring housing having an inner spring-retaining flange at one end with a bore passing therethrough and a machine threaded surface at its other end, the outside diameter of said spring housing being less than the inside diameter of said outer housing, the bore of the inner spring-retaining flange of said spring housing being larger than the diameter of said plug stem, said spring housing being located within said outer housing with its flanged end abutting the inner flange at said line-holding end of said outer housing, said plug stem projecting within said spring housing, a compression spring surrounding said plug stem, the outside diameter of said compression spring being less than the inside diameter of said spring housing, a spring-retaining clip fixed to the end of said plug stem confining said compression spring between said spring-retaining clip and said inner spring-retaining flange of said spring housing, a capping member abutting the leading end of said outer housing, said capping member having a machine-threaded surface matching and engaging with said machine-threaded surface of said spring housing, means of preventing rotation of said spring housing within said outer housing without preventing longitudinal movement of said spring housing within said outer housing, whereby said capping member can be turned on the matching machine threads to move said spring housing and said spring-retaining flange of said spring housing longitudinally within said outer housing thereby increasing or decreasing the compression of said compression spring.

7. A releasable, fishing line-holding device for use with a downrigger line and weight system for trolling, for releasably holding a fishing line to the downrigger system, said device comprising a hollow outer housing having a line-holding end with a bore passing therethrough and a leading end, the bore of said outer housing at its line-holding end being tapered progressively smaller from the outside inwardly, a poppet-shaped, line-holding plug member having a tapered line-holding portion and a plug stem, said tapered line-holding plug portion tapering progressively smaller in diameter toward the juncture of said tapered line-holding plug portion with said plug stem, the angle of taper of the bore at the line-holding end of said outer housing being substantially equal to the angle of taper of said tapered line-holding plug portion so as to provide a line-holding seat in the line-holding end of said outer housing for said tapered line-holding plug portion, the diameter of said plug stem being less than the inside diameter of the bore at the base of the line-holding seat in said line-holding end of said outer housing, said line-holding plug member being positioned with said plug stem projecting into said outer housing and the tapered surface of said line-holding plug portion resting against the tapered line-holding seat in the line-holding end of said outer housing, the size of said tapered line-holding plug portion being sufficiently large so that part of said line-holding plug portion projects outside the end of said outer housing, an inner flange at said line-holding end of said outer housing, a spring housing having an inner spring-retaining flange at one end with a bore passing therethrough and a machine threaded surface at its other end, the outside diameter of said spring housing being less than the inside diameter of said outer housing, the bore of the inner spring-retaining flange of said spring housing being larger than the diameter of said plug stem, said spring housing located within said outer housing with its flanged end abutting the inner flange at said line-holding end of said outer housing, said plug stem projecting within said spring housing, a compression spring surrounding said plug stem, the outside diameter of said compression spring being less than the inside diameter of said spring housing, a spring-retaining clip fixed to the end of said plug stem confining said compression spring between said spring-retaining clip and said inner spring-retaining flange of said spring housing, a capping member abutting the leading end of said outer housing, said capping member having a machine-threaded surface matching and engaging with said machine-threaded surface of said spring housing, a shaft passing through the walls of said outer housing and said spring housing, between said capping member and the end of said plug stem, wherein longitudinal slots in the wall of said spring housing permit passing therethrough of said shaft and permit longitudinal movement of said spring housing within said outer housing, whereby said capping member can be turned on the matching machine threads to move said spring housing and said spring-retaining flange of said spring housing longitudinally within said outer housing thereby increasing or decreasing the compression of said compression spring, and means for attaching said device to the downrigger system.

8. The device of claim 7 wherein said shaft is at an angle with the longitudinal axis of said outer housing in the range of 60° to 90°.

* * * * *

UNITED STATES PATENT OFFICE
CERTIFICATE OF CORRECTION

Patent No. 3,925,920                    Dated December 16, 1975

Inventor(s) William S. Walker

It is certified that error appears in the above-identified patent and that said Letters Patent are hereby corrected as shown below:

Column 1, line 38, "destined" should read -- desired --.

Column 1, line 41, patent number "3,639,370" should read -- 3,659,370 --.

*Signed and Sealed this*

*thirtieth* Day of *March 1976*

[SEAL]

*Attest:*

RUTH C. MASON
*Attesting Officer*

C. MARSHALL DANN
*Commissioner of Patents and Trademarks*